United States Patent
Bissen

(10) Patent No.: US 10,674,859 B2
(45) Date of Patent: Jun. 9, 2020

(54) METHOD AND DEVICE FOR OPERATING A COFFEE MACHINE AND/OR TEA MACHINE WITH FULLY SOFTENED WATER

(71) Applicant: Monique Bissen, Pforzheim (DE)

(72) Inventor: Monique Bissen, Pforzheim (DE)

(73) Assignee: ICon GmbH & Co. KG, Pforzheim (DE)

( * ) Notice: Subject to any disclaimer, the term of this patent is extended or adjusted under 35 U.S.C. 154(b) by 11 days.

(21) Appl. No.: 16/001,193

(22) Filed: Jun. 6, 2018

(65) Prior Publication Data

US 2018/0352998 A1 Dec. 13, 2018

(30) Foreign Application Priority Data

Jun. 7, 2017 (EP) ..................................... 17174831

(51) Int. Cl.
*A47J 31/40* (2006.01)
*A47J 31/46* (2006.01)
(Continued)

(52) U.S. Cl.
CPC ............... *A47J 31/402* (2013.01); *A23F 3/18* (2013.01); *A23F 5/262* (2013.01); *A47J 31/46* (2013.01); *A47J 31/605* (2013.01); *C02F 1/686* (2013.01); *C02F 2103/02* (2013.01); *C02F 2201/006* (2013.01)

(58) Field of Classification Search
CPC . A47J 31/402; A47J 31/46; A23F 3/18; A23F 5/262; C02F 1/686; C02F 2103/02
See application file for complete search history.

(56) References Cited

U.S. PATENT DOCUMENTS 4,528,200 A * 7/1985 Coleman ................. A23F 5/267
426/250
6,553,894 B1 4/2003 Hamon et al.
(Continued)

FOREIGN PATENT DOCUMENTS

JP 55144877 * 11/1980
WO WO 99/26883 6/1999
(Continued)

OTHER PUBLICATIONS

English Translation for WO 2017/021492 published Feb. 2017.*
(Continued)

*Primary Examiner* — Anthony J Weier
(74) *Attorney, Agent, or Firm* — Bryan W. Bockhop; Bockhop Intellectual Property Law, LLC

(57) ABSTRACT

The invention relates to a method and a device for preventing the blocking of the brew group, the filter holder or the coffee filter (8) in coffee machines when using fully softened water for the preparation of coffee. According to the invention, it is proposed to avoid the blocking of the machine by metering calcium and magnesium ions to the fully softened water. According to the invention this is achieved in that a device with a bag or reservoir (4) containing the calcium and magnesium ion containing solution, is positioned in a cartridge (3), which is arranged in the water tank of the coffee machine. The bag is in contact with the fully softened water via a capillary (5), which is closed with a check valve (6).

14 Claims, 2 Drawing Sheets

(51) Int. Cl.
*C02F 1/68* (2006.01)
*A23F 5/26* (2006.01)
*A23F 3/18* (2006.01)
*A47J 31/60* (2006.01)
*C02F 103/02* (2006.01)

(56) References Cited

U.S. PATENT DOCUMENTS

| | | | |
|---|---|---|---|
| 2005/0003068 A1* | 1/2005 | Kester | A23F 3/14 |
| | | | 426/597 |
| 2006/0021919 A1 | 2/2006 | Olson et al. | |
| 2016/0160479 A1* | 6/2016 | Hong | E03B 7/075 |
| | | | 137/565.01 |
| 2016/0167989 A1 | 6/2016 | Yoon et al. | |

FOREIGN PATENT DOCUMENTS

| | | |
|---|---|---|
| WO | 2017/021492 A1 | 2/2017 |
| WO | WO 2017/021492 A1 | 2/2017 |

OTHER PUBLICATIONS

EPO: "Europaischer Recherchenbericht" (European Search Report); Application No. EP 17 17 4831; dated Dec. 11, 2017.
EPO: "Mitteilung gemass Artikel 94(3) EPO" (Extended European Search Report); Application No. EP 17 17 4831; dated Jul. 15, 2019 (corresponding European case).

* cited by examiner

| Water Quality | Dosing in the Supply of the Coffee Preparation Unit | Runtime of Pump in the Coffee Machine for Coffee Preparation in sec. | Coffee Volume in ml | Blocking of Machine Display Malfunction |
|---|---|---|---|---|
| Tap Water TH 20°d | No Dosing | 31 | 200 | No, in 100% of the tests |
| Tap Water TH 20°d, softened to 0°d | No Dosing | 28 | 90 | Yes, in 100% of the tests |
| Tap Water TH 20°d, softened to 0°d | + 4°d as MgSO4 | 40 | 197 | No, in 100% of the tests |
| Tap Water TH 20°d, softened to 0°d | + 4°d as MgCl2 | 41 | 195 | No, in 100% of the tests |
| Tap Water TH 20°d, softened to 0°d | + 4°d as CaCl2 | 42 | 196 | No, in 100% of the tests |
| Tap Water TH 20°d, softened to 0°d | + 6°d as MgSO4 | 39 | 200 | No, in 100% of the tests |
| Tap Water TH 30°d | No Dosing | 31 | 190 | No, in 100% of the tests |
| Tap Water TH 30°d, softened to 0°d | No Dosing | 30 | 90 | Yes, in 100% of the tests |
| Tap Water TH 30°d, softened to 0°d | + 4°d as MgSO4 | 32 - 47 | 110 - 200 | Yes, in 50% of the tests |
| Tap Water TH 30°d, softened to 0°d | + 6°d as MgSO4 | 40 | 199 | No, in 10% of the tests |
| Tap Water TH 40°d | No Dosing | 32 | 190 | No, in 100% of the tests |
| Tap Water TH 40°d, softened to 0°d | No Dosing | 27 | 89 | Yes, in 100% of the tests |
| Tap Water TH 40°d, softened to 0°d | + 4°d as MgSO4 | 31 - 41 | 115 - 200 | Yes, in 50% of the tests |
| Tap Water TH 40°d, softened to 0°d | + 4°d as MgCl2 | 28 - 42 | 110 - 198 | Yes, in 50% of the tests |
| Tap Water TH 40°d, softened to 0°d | + 4°d as CaCl2 | 31 - 44 | 98 - 212 | Yes, in 50% of the tests |
| Tap Water TH 40°d, softened to 0°d | + 6°d as MgSO4 | 44 | 196 | No, in 100% of the tests |

*TH = Total Hardness

FIG. 1

METHOD AND DEVICE FOR OPERATING A COFFEE MACHINE AND/OR TEA MACHINE WITH FULLY SOFTENED WATER

CROSS-REFERENCE TO RELATED APPLICATION(S)

This application claims the benefit of European Patent Application No. EP17174831.2, filed Jun. 7, 2017, the entirety of which is hereby incorporated herein by reference.

BACKGROUND OF THE INVENTION

1. Field of the Invention

The invention relates to a method and a device for preventing blocking a coffee machine when making coffee with fully softened water and/or a tea machine in the preparation of tea with fully softened water.

2. Description of the Related Art

If fully softened water is used in the preparation of coffee, blocking of the coffee brewing group, the filter holder or the coffee filter in coffee machines occurs. The blocking is caused by fine abrasion, which is formed during tearing the coffee structure. The destruction of the coffee structure is caused by sodium ions contained in the fully softened water. The sodium ions react with the functional groups of the coffee and lead to the swelling of the coffee powder and the tearing of the coffee structure. The tearing of the coffee structure causes superfine abrasion, which blocks the fine-pored outlets of the brewing group, the filter holder or the coffee filter. Since the water by the blockage of fine-pored outlets cannot be displaced from the coffee powder the extracted residue is not a dry coffee cake but rather muddy.

It is an object of the invention to provide a device and a method for operating a coffee machine and/or tea machine with fully softened water.

SUMMARY OF THE INVENTION

The object of the invention is solved by a solution container according to claim 1, a method according to claim 8, a coffee machine and/or tea machine according to claim 17 and a use according to claim 18. The dependent claims claim preferred embodiments.

An inventive solution container is designed to be arranged in a water tank of a household appliance or in a supply line to the household appliance. The water tank can be a coffee machine and/or a tea machine. The solution container comprises a cover, an aqueous solution and a metering device. The aqueous solution is positioned in the cover and comprises alkaline earth metal ions. The metering device is adapted to supply the aqueous solution to the cover and the water in the water tank in a controlled way. The metering device can be an active metering device, for example, an active valve or a pump, or a passive metering device.

The metering device may be a capillary adapted to be in fluid connection (fluid communication) with the aqueous solution in the cover and the water in the water.

The alkaline earth ions may be calcium ions and/or magnesium ions.

As soon as a pump of the household appliance sucks in water, it results in a negative pressure in the water tank. The capillary controls the amount of calcium ions and magnesium ions, which are supplied to the water in the water tank. This renders possible to supply a deterministic amount of calcium ions and/or magnesium ions to the water in the water tank. The water in the water tank is full-softened water. By the addition of calcium ions and/or magnesium ions the functioning of the household appliance in particular the coffee and/or the tea machine is improved. Further the taste of the coffee or of the tea is improved.

In one embodiment, the cover is adapted to change the volume enclosed by the cover. The amount of the aqueous solution in the cover changes, when the capillary delivers the aqueous solution to the water reservoir. Because the cover changes its volume, no negative pressure is formed in the cover as the volume of the aqueous solution decreases. Consequently, no vent opening can be provided. As a result, the inventive solution bag is suitable to be placed in a water tank.

In one embodiment, the cover may comprise a flexible material. The cover may contract with decreasing volume of the aqueous solution. Consequently, no air supply opening in the cover is required.

In one embodiment, the cover may change its form, shape volume due to the pressure difference between the inside and the outside of the solvent container. For example, the envelope may be foldable. Also this embodiment ensures that no vent is required and the cover may be completely enclosed by the water in the container.

In one embodiment, the solution container may include a valve that is arranged in fluid connection with the aqueous solution in the cover and that is designed to deliver the aqueous solution to the water in the water tank and to prevent the entry of water from the water tank into the cover. This allows the concentration of calcium ions and magnesium ions in the aqueous solution to be kept in a deterministic value range.

The invention is also achieved by a method for supplying water to a coffee machine and/or a tea machine comprising the step of supplying fully softened water from a softening device in the direction of the coffee machine and/or tea machine and the step of brewing of the supplied water in the coffee machine and/or tea machine. According to the invention, alkaline earth ions are added to the fully softened water before the step of brewing the supplied water.

In one embodiment, the step of supplying alkaline earth ions comprises dosing the alkaline earth ions so that the supplied water comprises a hardness in a range of about 4° d to about 8° d, preferably from about 2° d to about 14° d. In this hardness ranges, a functioning of the coffee machine and/or tea machine and a pleasant taste of the brewed coffee or tea is ensured.

In one embodiment, the process results in an aqueous solution of alkaline earth ion to be supplied to the supplied water. In another embodiment, the process supplies the alkaline earth ions by means of a salt.

In yet another embodiment, the step of supplying alkaline earth metals includes supplying of alkaline earth ions by means of a metering device, for example, actively actuated valves, micro-pump or the like. In yet another embodiment, the alkaline earth ions may be added to the fully softened water by adding the fully softened water into a container in which limestone is located. The limestone may be in a ground state, so that the alkaline earth ions can be faster dissolved in the fully softened water. Alternatively, or in addition, the water is directed into a container containing dolomite. The dolomite can be ground. It is possible that in the container both limestone and also dolomite are located.

In one embodiment, the alkaline earth ions are added by means of a capillary. This makes it possible to reproducibly determine the amount of alkaline earth ions, which have been supplied to the fully softened water by means of a passive element.

In one embodiment, the alkaline earth ions may be fed to the fully softened water in a cartridge, which is located outside the coffee machine and/or the tea machine. In another embodiment, the alkaline earth ions are fed to the fully softened water in a container, which is located outside the coffee machine and/or the tea machine. In yet another embodiment, the alkaline earth ion can be supplied to the fully softened water within the coffee machine and/or within the tea machine. In yet another embodiment the alkaline earth ions are supplied to the fully softened water in a supply line of the coffee and/or the tea machine.

In one embodiment, the method comprises the step of placing the before described solution bag in a fluid container in the coffee machine and/or the tea machine and/or comprises the step of placing the previously described solution bag in a container, which is coupled to a supply line to the coffee machine and/or the supply line of the tea machine.

The method further includes the step of generating a negative pressure in at least one component of the coffee machine and/or the tea machine and/or a supply line to the coffee machine and/or the tea machine, wherein the negative pressure and vacuum, respectively causes a removal of the aqueous solution through the capillary from the inside the cover of the solution container.

The alkaline earth ions may be calcium ions and/or magnesium ions.

The invention also relates to a coffee machine and/or a tea machine with the previously described solution container.

The invention further relates to a use of the previously described solution container for supplying alkaline earth ions to water, which is supplied to a brewing device of a coffee machine and/or a tea machine.

The water is heated while making coffee in the machine and the coffee is moistened with hot water. Within 1 to 3 seconds the coffee swells. The water is pressed through the moistened ground coffee. The water pressure is slowly increased to values between 9 and 16 bar. Hereby the aroma and flavors are extracted from the ground coffee. The extraction process should last 20 to 25 seconds at maximum, since otherwise bitter substances are extracted from the ground coffee. After a successful extraction the remaining coffee powder, the so-called coffee cake, is dry.

By using hot water, there is a risk that the coffee machines scale due to the presence of hardness formers and block the system due to calcium deposits. To solve the calcification problems various methods are used in practice. One possibility is to remove the calcium deposits in the machine through the regular use of acids. Another option is the use of ion exchangers, which remove the hardeners calcium and magnesium from the water. The ion exchangers are either centrally located in the building entrance or the water is directly prepared at the tap, the so-called point of Use (PoU).

Central softening plants are used at the inlet to the house, which contain a strong acidic cation exchanger. In the softener both the temporary hardness, i.e. calcium and magnesium ions bound to bicarbonate, as well as the permanent hardness, i.e. calcium and magnesium ions, which are bound to the strong acid anions, e.g. sulphate, chloride, nitrate. The water is either partially or fully softened. When fully softening, the total volume flow of the incoming water is passed over the ion exchanger and the calcium and magnesium ions are completely removed from the water. When partial softening is applied, only a partial flow of the incoming water is fully softened. The remaining water is bypassed by the water softener and is mixed with the fully softened water after the softener.

During the treatment of the water at the tapping point (the so-called PoU) filters which are filled with a weakly acidic cation exchanger, are used. The filters are placed in the water inlet of the machines, which have a fixed water connection, directly into the water tank of hot drink machines or installed in so-called open systems, in which the water is processed in pitchers. The weakly acidic cation exchangers are used unbuffered from, i.e. are used in hydrogen form (H+ form) or are buffered with sodium or potassium. Only the temporary hardness is removed from the water. The water is partially softened or de-carbonated. Calcium and magnesium ions, which are bound to bicarbonate are exchanged to sodium or potassium ions and hydrogen ions. By the reaction of bicarbonate ions with hydrogen ions carbonic acid is formed and as a result, a pH drop in the water from values above pH 7 to values from pH 4.5 to 6.0 is caused.

Due to the softening and de-carbonization there is a change in the ingredients in the water. Because of this it comes to other reactions of the water with the coffee ingredients or compounds and thus to a change in the coffee extraction process and coffee taste. The reduced content of bicarbonate (alkalinity) in de-carbonated water, can for example, lead to a reduced neutralization of extracted caffeic acids so that the coffee tastes more sour. The acidic pH of de-carbonated water also makes the taste of coffee to appear more acidic as the acidity of the beverage increases.

When using fully softened water in which the hardness formers calcium- and magnesium ions have been completely replaced by sodium ions, the coffee taste due to the absence of calcium and magnesium ions is impaired negatively. This is because the reaction of sodium ions with the coffee ingredients is different to the reaction of calcium and magnesium ions with the coffee ingredients. As a result, the chemical and physical parameters change during the extraction process and a negative change in the release of flavor and flavorings occurs.

In addition, it shows in practice that when using fully softened water in coffee machines, the structure of the coffee is heavily destroyed or the ground coffee ingredients are mechanically teared apart. This results in fine abrasion, which blocks the fine-pored outlets of the brewing group, the filter holder and the inserted coffee filter. The phenomenon is caused by sodium ions present in the water. In practice it turns out that the effect is more significant in respect to finer ground coffee due to the larger number of particles and the higher surface.

The obstruction of the brewing group, the filter holder and the filter used in coffee capsules causes the pump, which presses or moves the water through the coffee grounds, goes to error due to the high pressure loss in the coffee preparation chamber. In other cases, in the machine control a maximum extraction time for a defined coffee volume is specified and the machine indicates a fault, since the coffee volume in the given time is not reached.

Based on this, the present invention is based on the object, to provide a method and a device for water treatment, in which the above-described disadvantages of obstruction of the brewing group, the filter and the coffee filters used in coffee machines, which use fully softened water in coffee preparation, do not occur.

Surprisingly, it could be determined that it was with the help of the addition of water hardness, i.e. calcium and/or magnesium ions to fully softened water, it is possible to avoid the blockage in the coffee machine. It could be proved that the ground coffee is less strongly destroyed by the addition of calcium and/or magnesium ions to full softened water and thus less fine abrasion is formed. The sodium ions are bound to functional groups due to the contact with the high-molecular coffee compounds. This causes a change of the chemical structure as well as the spatial arrangement of these compositions. By this change modified molecular forces occur in ground coffee leading to the macromolecular destruction of the ground coffee. The calcium and magnesium ions become also bound by the functional groups in coffee, but due the divalent charge of these compounds, this has no destructive effect on the spatial structure and the forces acting in the ground coffee. Surprisingly it was found that the calcium and magnesium ions are preferably absorbed by the coffee ground, so in the presence of calcium and magnesium ions the impact of sodium ions on the coffee structure decreases. If functional groups of the coffee are blocked by calcium and magnesium ions, the reaction and binding of sodium ions to the coffee structure is less pronounced and the molecular forces leading to destruction of the coffee structure are lower.

By this method according to the invention, the clogging of the pores of the brewing group, the filter holder and the filter in coffee capsules is avoided. Advantage of the present invention is that when using the method in coffee machines the setting of the softener, which is installed at the water inlet of the house and supplies fully softened water, does not need to be changed. The water distribution system in the house thus retains full limestone protection.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a table with attempts to dose water hardness in fully softened water to prevent blocking of the coffee machine (malfunction indication during coffee making process).

DETAILED DESCRIPTION OF THE INVENTION

Figure 2:
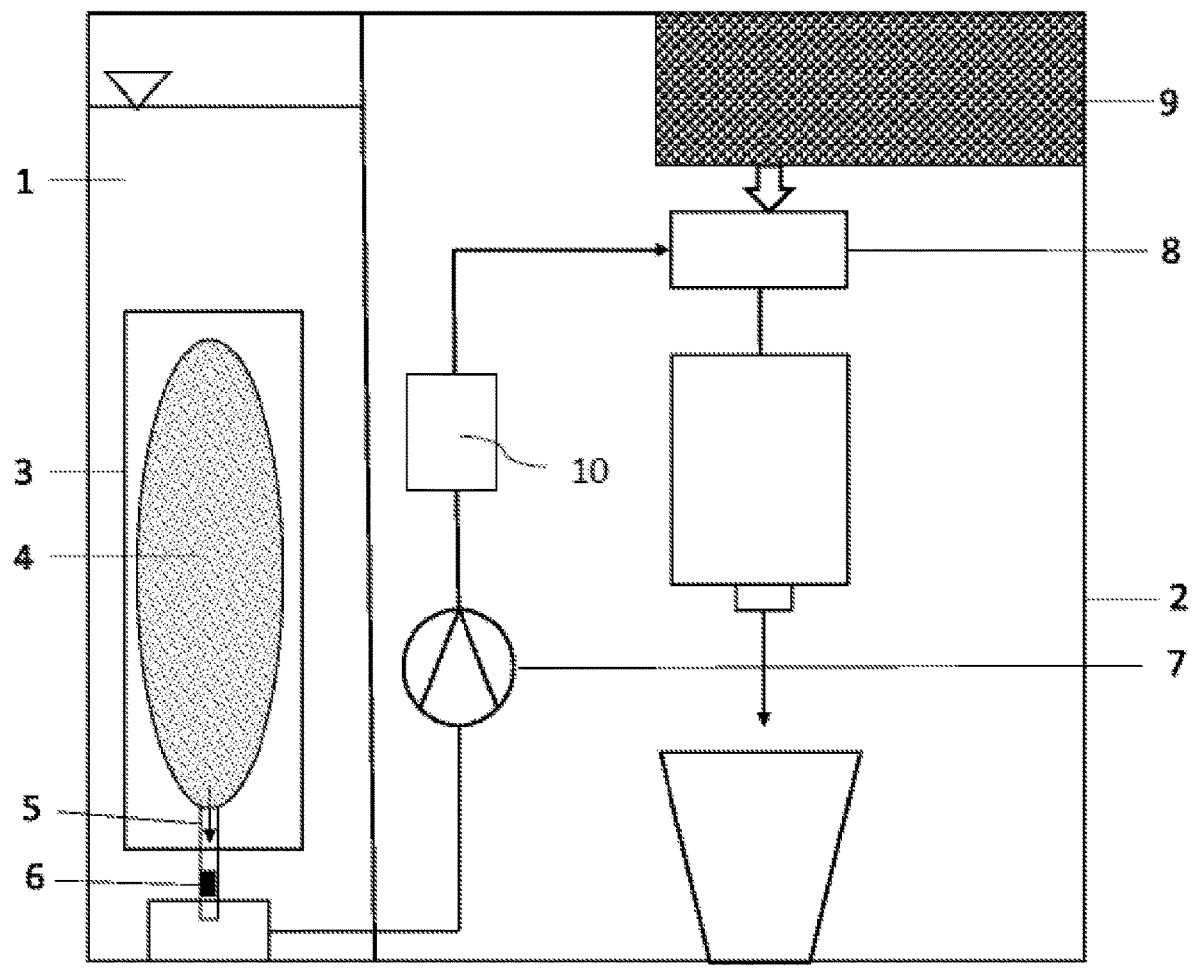
FIG. 2 is a schematic view of a coffee machine with the solution container of the invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, Table 1 shows the behavior of a coffee machine using various water qualities. The table contains (a) information on running times of the pump pushing water through the coffee, (b) the resulting coffee volume per reference and (c) information as to whether the machine is blocking or displaying a malfunction. When using tap water at a total hardness between 20° d and 40° d no disturbance during coffee preparation occurs. 200 ml of coffee are prepared within 30 seconds. If this tap water is fully softened, a blocking of the machine occurs during coffee preparation and the machine indicates a fault.

It has been demonstrated that such a fault no longer occurs with the inventive method and device when the fully softened water are supplemented by calcium and/or magnesium ions.

When fully softened tap water is used for coffee preparation with an initial hardness of 20° d, the blocking of the coffee machine can be avoided by adding to the water 4° d total hardness in the form of magnesium sulfate, magnesium chloride or calcium chloride. The extraction time or the pump running time decreases in comparison to the use of non-softened water by a few seconds, but the resulting coffee volume corresponds approximately to the coffee volume, which when using non-softened water, is achieved. The machine indicated no malfunction. If fully softened water with an initial hardness of 30° d and 40° d is used, more hardness has to be added to the water to avoid machine blocking. The results show that by using the method the blocking the coffee machine can be avoided, as shown in FIG. 1.

For coffee machines with fixed water connection or coffee machines with a water tank a metering pump for hardness entry into fully softened water ca be used, which doses an aqueous solution of defined water hardness in the water. Another option is to place in a cartridge limestone or dolomite as a solid, to direct a partial stream of fully softened water over the solid so that calcium ions and magnesium ions are dissolved and a defined water hardness in the total water is achieved.

Alternatively, in the water tank 1 of a coffee machine 2, which contains fully softened water, or in front of a coffee machine, a device with a cartridge 3, a bag 4, which comprises an aqueous solution of defined water hardness, can be installed. From the bag a defined volume of aqueous solution is removed via a capillary 5, which is closed by means of a check valve 6. The removal takes place at negative pressure when receiving water through the pump 7 of the machine, which supplies water to the brewing group 10 or the coffee capsule with. Calcium and/or magnesium ions or water hardness is metered to the fully softened water during this process. That water supplemented with water hardness is pumped to the brewing group 10, the cartridge or the coffee filter 8, by a pump 7 and the coffee 9 is extracted.

The capillary can be made of plastic, for example PEEK. According to another embodiment the capillary may include metal, such as stainless steel. The length of the capillary can be between about 5 mm to about 40 mm. The inner diameter of the capillary can be between about 0.1 mm to about 1.5 mm. The capillary is preferably perpendicular to the flow direction of the water, into which the calcium and magnesium ions are metered.

The bag is retro-fittable and can be positioned in any existing coffee machine and/or tea machine. In one embodiment, the solution container may be connected to an adapter in the tank of the coffee and/or tea machine.

The envelope may be a balloon or a thin pouch made of, for example polyurethane.

An embodiment of the cartridge provides a foldable bag which for example, is made of polyethylene and includes the water-hardness containing aqueous solution in its interior. The foldable bag folds with decreasing fluid volume. It is connected by a capillary with the water flow. If the pump pulls water, a check valve opens and by a capillary water hardness in the form of calcium ions and/or magnesium ions is dosed ions into the fully softened water.

The invention relates in summary to a method and a device for prevention of blockage of the brewing group, the filter holder or the coffee filter 8 in coffee machines when using fully softened water for the preparation of coffee. According to the invention, is it suggested to avoid the blocking of the machine by adding calcium and magnesium to the fully softened water. According to the invention this is achieved in that a device with a bag or reservoir 4, which contains the calcium and magnesium ion-containing solution is placed in a cartridge 3, which is mounted in the water tank of the coffee machine. The bag is in contact, e.g. by a fluid connection with the fully softened water by a capillary 5, which is closed with a check valve 6.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A solution container, which is adapted to be arranged in a water tank of a domestic appliance or in a water tank of a supply line to the domestic appliance, comprising:
   a cover;
   an aqueous solution, which is arranged in the cover and comprises alkaline earth ions;
   a metering device, which is adapted to be in fluid communication with the aqueous solution in the cover and water in the water tank and to dispense the aqueous solution into the water tank;
   wherein the cover includes an elastic material and has a volume that is changeable due to a pressure difference between inside and outside of the solution container.

2. The solution container according to claim 1, wherein the alkaline earth metal ions are calcium ions and/or magnesium ions.

3. The solution container according to claim 1, wherein the cover is adapted to change in volume.

4. The solution container according to claim 1, wherein the cover may change its shape and volume due to the pressure difference between the interior and the exterior of the solution container.

5. The solution container according to claim 1, further comprising a valve arranged in fluid communication with the aqueous solution in the cover and adapted to dispense the aqueous solution.

6. A method for supplying water to a coffee machine or a tea machine, comprising the following steps:
   supplying fully softened water from a softener in direction of the coffee machine and/or the tea machine;
   supplying alkaline earth ions to the fully softened water to make an aqueous solution; and
   brewing coffee or tea with the aqueous solution supplied to the coffee machine and/or the tea machine;
   further comprising the step of arranging in a selected one of a coffee machine, a tea machine, a supply line to the coffee machine, or a supply line to the tea machine, a solution container that includes:
   a cover;
   an aqueous solution, which is arranged in the cover and comprises the alkaline earth ions; and
   a metering device, which is adapted to be in fluid communication with the aqueous solution in the cover and water in the water tank and to dispense the aqueous solution into the water tank
   wherein the cover has an elastic material and its volume may change due to the pressure difference between the inside and the outside of the solution container.

7. The method of claim 6, further comprising the step of generating a negative pressure in at least one component of the coffee machine and/or tea machine, wherein the negative pressure causes a removal of the aqueous solution from the inside of the cover of the solution container.

8. The method of claim 6, wherein in the step of supplying alkaline earth ions, the alkaline earth ions are dosed to the fully softened water in a way that the supplied water has a hardness in a range of about 4° d to about 8° d.

9. The method of claim 6, wherein the step of supplying alkaline earth ions comprises at least one of the following steps:
   supplying an aqueous solution with alkaline earth ions;
   supplying the alkaline earth ions by means of a solid; and
   supplying the alkaline earth ions by means of at least one salt.

10. The method of claim 6, wherein the step of supplying alkaline earth ions, comprises at least one of the following steps:
    supplying the alkaline earth ions by means of a metering device;
    passing the fully softened water into a container containing limestone; and
    passing the fully softened water into a container containing dolomite.

11. The method of claim 6, wherein the alkaline earth ions are supplied by means of a capillary.

12. The method of claim 6, The method according to claim 8, wherein the step of supplying alkaline-earth ions comprises at least one of the following steps:
    supplying the alkaline earth ions to the fully softened water in a cartridge;
    supplying the alkaline earth ions to the fully softened water in a container;
    supplying the alkaline earth ions to the fully softened water within the coffee machine and/or tea machine; and
    supplying the alkaline earth ions to the fully softened water in a supply line of the coffee machine and/or tea machine.

13. A coffee machine or a tea machine comprising a solution container which is adapted to be arranged in a water tank, in which the solution container includes:
    a cover;
    an aqueous solution, which is arranged in the cover and comprises alkaline earth ions; and
    a metering device, which is adapted to be in fluid communication with the aqueous solution in the cover and the water in the water tank and to dispense the aqueous solution into the water tank
    wherein the cover has an elastic material and its volume may change due to the pressure difference between the inside and the outside of the solution container.

14. The coffee machine or a tea machine of claim 13 in which the alkaline earth ions are supplied to the water, which is supplied to a brewing device.

* * * * *